Figure 5:
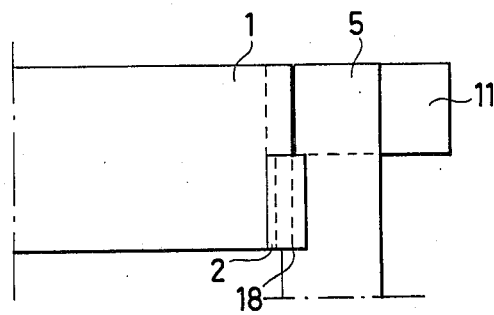

United States Patent [19]

Larsson et al.

[11] 4,360,287

[45] Nov. 23, 1982

[54] DEVICE FOR FORMING CORNER JOINTS OF WALL ELEMENTS

[76] Inventors: Rolf E. Larsson, Långgatan 70; Erik E. Eriksson, Svevägen 6, both of 830 60 Föllinge, Sweden

[21] Appl. No.: 167,480

[22] Filed: Jul. 11, 1980

[30] Foreign Application Priority Data

Jul. 30, 1979 [SE] Sweden ............................... 7906485

[51] Int. Cl.³ .............................................. F16B 5/12
[52] U.S. Cl. .................... 403/219; 403/347; 217/65; 52/763
[58] Field of Search ............... 403/217, 219, 382, 347; 217/65, 43

[56] References Cited

U.S. PATENT DOCUMENTS

| | | | |
|---|---|---|---|
| 1,300,671 | 4/1919 | Still | 217/43 |
| 1,608,702 | 11/1926 | Lindblom | 217/65 |
| 2,097,172 | 10/1937 | Yurkovitch | 403/219 |
| 3,429,472 | 2/1969 | Rogers, Jr. | 217/65 |

*Primary Examiner*—Andrew V. Kundrat
*Attorney, Agent, or Firm*—Silverman, Cass & Singer, Ltd.

[57] ABSTRACT

A device in which wall elements are jointed together by corner joints to form house walls, partitions, frames, boxes, etc. The wall elements are formed identical, and the wall elements (1,2, FIG. 9) preferably at both ends having a recess determined by an edge surface of the wall element and a projection. The projection, in the transverse direction of the wall element, has the same width as the length of the edge surface. The projections have two sides. One side is provided with a guide groove extending in the transverse direction of the wall element for receiving an edge surface of another wall element. On the other side the projections are provided with a support groove also extending in the transverse direction of the wall element for engaging with a corner post.

2 Claims, 9 Drawing Figures

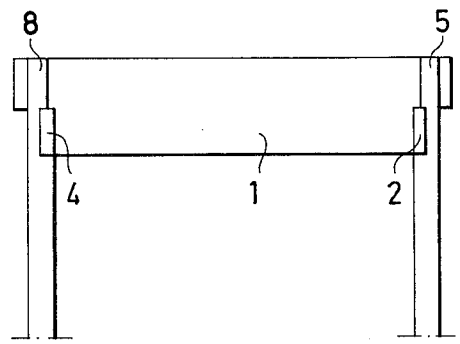
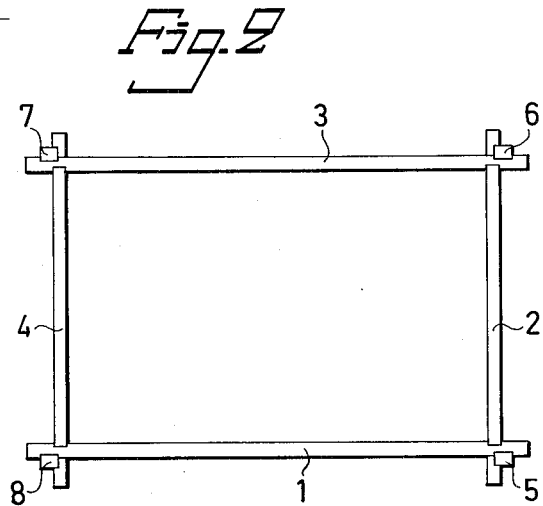
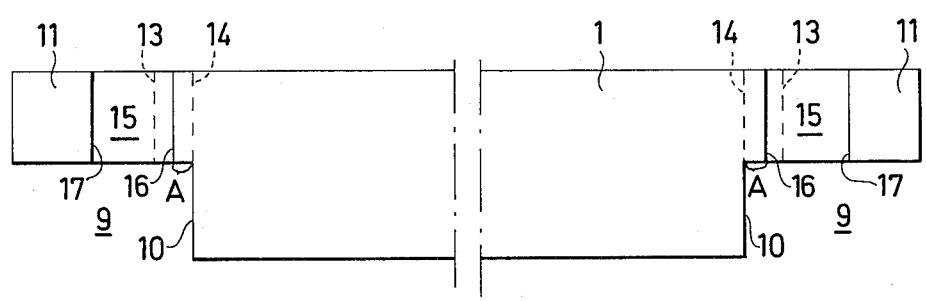
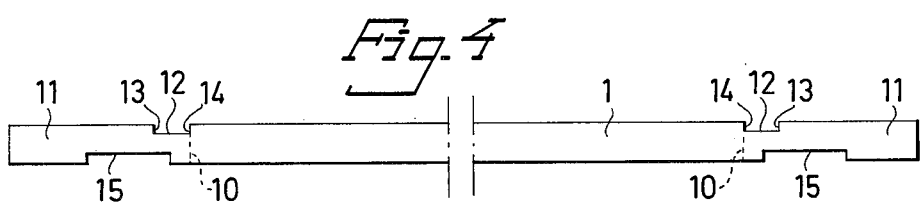

DEVICE FOR FORMING CORNER JOINTS OF WALL ELEMENTS

This invention relates to a device for forming corner joints of wall elements, the corner joints being locked by corner posts, and the wall elements being joined together to provide house walls, partitions, frames, boxes etc.

It is known to form sparse sides of a box or the like, where rods or laths with interspaces between themselves are interconnected by means of a support ledge at the ends of the laths. The laths are provided on their outside with a transverse groove, and the ends of the laths of one side are attached in the interspaces of the adjacent side between the laths of this side, and a corner post is fitted into the transverse grooves in order, together with the support ledge, to effect locking of the corner joint. It also is known to form tight sides in a box or the like, where they are formed of one or more boards, both ends of which have pegs as well as interspaces therebetween, transverse grooves and corner posts. One disadvantage common to both these structures is that in the joining operation, the pegs of one side must be driven through the interspaces of the other side by displacing the sides longitudinally, which is both troublesome and tedious. In the firstmentioned case, moreover, the laths are first to be attached in spaced relationship on the support ledge, and in the second case the box will not be sufficiently tight in the corners. When the sides have substantial height, several workers are required to participate in aligning and displacing the sides being assembled.

The present invention has the object of rendering possible a simpler and faster assembly of wall elements to form house walls, partitions, frames, boxes etc. with tight walls and also tight corner joints.

This object is achieved according to the present invention, by a device of wall elements.

Figure 7:
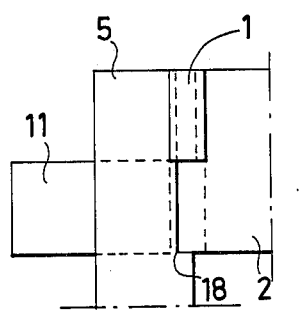
Figure 6:
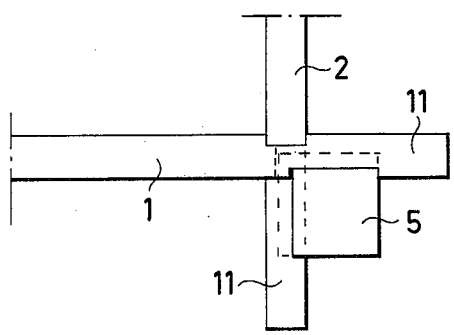
Figure 8:
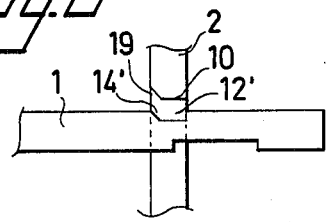
Figure 9:
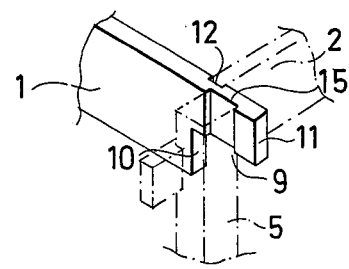

The invention is illustrated by way of an embodiment shown as an example in the accompanying drawings, in which FIGS. 1 and 2 are, respectively, a lateral view and a horizontal view of a box provided with legs and designed according to the invention, FIGS. 3 and 4 show on an enlarged scale a wall element for the box designed according to the invention, seen, respectively, from the side and from above, the central portion of the box being cut off, FIGS. 5 and 6 are, respectively, a lateral view and a horizontal view of a corner joint in the box, FIG. 7 shows the corner joint seen from the right in FIG. 5, FIG. 8 is a horizontal view of a slightly modified corner joint being assembled, and FIG. 9 is a perspective view of a corner joint according to the invention.

In FIGS. 1 and 2 the sides of the box are formed of wall elements 1,2,3 and 4 held together by corner posts 5,6,7 and 8, which simultaneously form legs of the box. The wall elements 1–4 are entirely identical but are turned in different ways to form the box walls. The lower side or edge of all wall elements is located in the same plane, and also their upper side or edge is located in one and the same plane, so that a bottom and a cover (not shown), respectively, can be attached tightly to the lower sides or edges and the upper sides or edges. Alternatively, ledges (not shown) can be provided on the inside of the wall elements adjacent their lower edge for supporting the bottom.

The wall element 1 shown in FIGS. 3 and 4 according to which also the remaining wall elements 2–4 are designed, includes at both ends a recess 9, the depth of which is indicated or determined by the edge surface 10 perpendicular to the longitudinal direction of the wall element and is equal to half the width of the wall element, so that a projection 11 is formed, the width of which is equal to the depth of the recess 9, i.e. the length of the edge surface 10. Both projections 11 of the wall element are provided on one side with a guide groove 12 perpendicular to or transverse of the longitudinal direction of the wall element. The sides 13,14 of said grooves 12 are formed as shoulders with a spaced relationship equal to the thickness of the wall element 1. One side 14 is substantially aligned with the contact surface 10. Both projections 11 of the wall element further are provided on their other side with a support groove 15. One side 16 of groove 15 is located at a distance A from the contact surface 10, which distance A is about equal to half the thickness of the wall element while the width of the support groove 15 insignificantly exceeds the width of the side surface of a corner post 5–8. The other side of the support groove 15 is designated by 17.

For joining together the wall elements 1–4 at the corners of the box, as shown in FIGS. 5–7 and 9, at first two wall elements 2,4 are placed edgeways in parallel, their projections 11 face downward, and are spaced a distance relative to each other that is about equal to the distance between the edge surfaces 10 of a wall element. Two wall elements 1–3 are held edgeways, their projections 11 are located upwardly above each wall element 2,4, and their edge surfaces 10 are aligned with the bottom of the guide grooves 12 and the sides 14 are aligned with the edge surfaces 10 of the wall elements 2,4. Thereafter the wall elements 1,3 most simply are pushed down into engagement with the wall elements 2,4, and corner posts 5–8 are pressed or driven into engagement with the support grooves 15. Thereby the sides 17 of the support grooves 15 as well as the bottom firmly abut a pair of sides of the support post, so that the edge surfaces 10 are pressed against the bottom of the guide grooves 12, and especially the sides 13 of the guide grooves 12, form an effective lateral support for the portion of the respective wall element projecting into the respective guide groove 12.

When the corner posts 5–8, as shown in FIGS. 1,2, at the same time shall form legs for a box or the like, the corner posts are extended and preferably are formed with a shoulder or head 18, on which the lower side of a wall element rests. Said shoulder or head can be replaced by a wood screw through the projections 11 and into the corner posts. This can be utilized preferably when the corner posts do not form legs, but merely extend along the wall elements.

According to the embodiment shown in FIG. 8, the side 14' of the guide groove 12' is inclined, and the edge surface 10 co-operating therewith has a chamfer 19, so that the wall element 2 easily is inserted and wedged in the groove 12' of the wall element 1. The wall elements 2,4 then also are designed preferably in the same way.

The design according to the present invention shows particularly the advantage that the manufacture is simple, because all wall elements are to be alike, and that the assembly can be carried out quickly and handily, due to the fact that two wall elements are placed in parallel with the necessary spaced relationship, the other two wall elements simply are pushed down, and the corner posts are inserted, whereafter the upper projections can be secured on the corner posts by nails, screws etc. The wall elements projecting into the guide joints 12, they are stayed relative to each other already before the corner posts are attached, and the corner joints are substantially tight. Two or more wall elements can be attached one above the other to form a wide surface or side, and a seal then possibly can be placed in the joint between the wall elements.

The invention can be applied to a pair of walls forming substantially a right angle with each other. It may be sufficient that only one end of the wall elements is provided with recess and projection. The invention further can be applied to box constructions of different kind and for different materials or for frame structures, for example for the body of tables where the corner posts form the table legs and a table top is attached on the assembled frame. The materials of the wall elements may be of different kind, such as wood, plastic, sheet metal, light metal etc. The wall element portion intended to be inserted into a guide groove may have a thickness smaller than that of the wall element, the guide groove then being correspondingly narrower.

We claim:

1. A device for forming corner joints of wall elements comprising:

wall elements that are formed identical to one another, at least one end of each wall element being provided with one projection and one recess, the depth of the recess being determined by an edge surface of the wall element and being equal to half the width of the wall element taken in the transverse direction of the wall element, and the width of the projection being equal to the depth of the recess, the projection having two sides, one side of the projection being provided with a support groove and the other side of the projection being provided with a guide groove, the guide groove having a width equal to the thickness of the wall element and having a side substantially aligned with the edge surface of the wall element with the edge surface of one wall element being engagable in the guide groove of another wall element; and corner posts engagable in the support grooves of the wall elements.

2. The device as claimed in claim 1 in which said side of said guide groove is inclined and said edge surface of the wall element has a corresponding chamfer for guiding against the inclined side of said guide groove.

* * * * *